US 6,359,780 B1

(12) United States Patent
McMahan et al.

(10) Patent No.: US 6,359,780 B1
(45) Date of Patent: Mar. 19, 2002

(54) APPARATUS AND METHOD FOR COOLING A HEAT GENERATING COMPONENT IN A COMPUTER

(75) Inventors: Robert L. McMahan, Cedar Park; Damon W. Broder, Austin, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/456,191

(22) Filed: Dec. 7, 1999

(51) Int. Cl.⁷ .................................................. G06F 1/20
(52) U.S. Cl. ........................ 361/687; 361/689; 361/696; 361/717; 174/15.2; 165/104.33
(58) Field of Search ................................. 361/683–709, 361/717–722; 165/86, 185, 80.2–80.4, 104.26, 104.32, 104.33, 104.24, 104.36, 104.29; 174/16.3, 15.2; 62/259.2; 364/708.1; 257/706–727; 415/122.1, 124.2, 175–177, 178

(56) References Cited

U.S. PATENT DOCUMENTS

| | | | |
|---|---|---|---|
| 5,138,523 A | | 8/1992 | Benck et al. |
| 5,424,913 A | | 6/1995 | Swindler |
| 5,430,609 A | * | 7/1995 | Kikinis ........................ 361/687 |
| 5,588,483 A | | 12/1996 | Ishida |
| 5,598,320 A | | 1/1997 | Toedtman et al. |
| 5,621,613 A | | 4/1997 | Haley et al. |
| 5,646,822 A | | 7/1997 | Bhatia et al. |
| 5,781,409 A | | 7/1998 | Mecredy, III |
| 5,835,348 A | * | 11/1998 | Ishida .......................... 361/699 |
| 5,847,925 A | | 12/1998 | Progl et al. |
| 5,880,929 A | | 3/1999 | Bhatia |
| 5,898,567 A | | 4/1999 | Satake |
| 5,910,844 A | | 6/1999 | Phillips et al. |
| 5,969,940 A | * | 10/1999 | Sano et al. ................... 361/687 |
| 6,002,587 A | * | 12/1999 | Shusa et al. ................. 361/704 |
| 6,031,721 A | * | 2/2000 | Bhatia .......................... 361/695 |
| 6,125,035 A | * | 9/2000 | Hood et al. .................. 361/687 |
| 6,137,683 A | * | 10/2000 | Lee et al. ..................... 361/704 |
| 6,226,178 B1 | * | 5/2001 | Broder et al. ................ 361/687 |

FOREIGN PATENT DOCUMENTS

| | | | | |
|---|---|---|---|---|
| JP | 410126080 A | * | 5/1998 | ............ H05K/7/20 |
| JP | 411067997 A | * | 3/1999 | ......... H01L/23/427 |

\* cited by examiner

*Primary Examiner*—Leo P. Picard
*Assistant Examiner*—Michael Datskovsky
(74) *Attorney, Agent, or Firm*—Haynes and Boone, L.L.P.

(57) ABSTRACT

A computer system including an enclosure having a face with an opening formed therein. A door is pivotally mounted on the enclosure adjacent to the opening for being moved between an open position and a closed position with respect to the opening. A removable heat generating component is mounted in the enclosure adjacent to the opening and a heat extraction member is attached to the door. A remote heat dissipating body is mounted in the enclosure. A heat routing member is attached at a first end to the heat extraction member and at a second end to the heat dissipating body. The heat extraction member engages a surface of the heat generating device when the door is in the closed position. The removable heat generating component can be cooled using the heat routing member and the remotely located heat dissipating body while still permitting the heat generating component to be readily accessed through the opening in the enclosure.

17 Claims, 3 Drawing Sheets

APPARATUS AND METHOD FOR COOLING A HEAT GENERATING COMPONENT IN A COMPUTER

BACKGROUND

The disclosures herein relate generally to computer systems and more particularly to an apparatus and method for cooling a heat generating component in a computer.

To continually increase the performance of portable computers, high performance memory devices are now being used in portable computers. RAMBUS™ inline memory modules, available from Rambus Incorporated, are memory devices that offer high-speed operation, excellent reliability and cost effectiveness. From a performance standpoint, these characteristics make Rambus in-line memory modules an excellent choice for use in portable computers.

As a result of the high-speed operation of Rambus in-line memory modules, a considerable amount of heat is produced. Rambus in-line memory modules can produce peak thermal dissipation of up to 1.7 watts. In addition, Rambus in-line memory modules have exposed semiconductor die surfaces with the peak surface temperatures approaching 100 deg. C. during operation. An adequate amount of cooling of the Rambus in-line memory modules is required to attain the intended performance and reliability. While such cooling requirements are not exceptionally difficult to attain in desktop computers, the density and orientation of system components in portable computers make cooling system components such as memory modules more challenging.

Techniques for cooling heat generating components in portable computers are known. For example, U.S. Pat. No. 5,898,667 discloses a portable computer including an enclosure and a heat sink for cooling a heat generating component. The heat sink includes a heat radiating portion that extends through an opening in the enclosure. A key limitation of the technique of this disclosure is that the heat sink must be removed to permit access to the heat generating component. U.S. Pat. No. 5,424,913 discloses a portable computer having a memory door with an integral heat sink. The door can be pivoted between an open and closed position for providing access to the memory devices. The heat sink portion of the door is engaged with the heat generating component when the door is in the closed position. A key limitation of the technique of this disclosure is that the temperature of the door is significantly elevated during operation of the portable computer. U.S. Pat. Nos. 5,880,929; 5,847,925; and 5,598,320 disclose cooling apparatus using a heat pipe for routing heat from a heat generating component to a remote heat dissipating body. In some embodiments, the heat dissipating body may be pivoted or otherwise displaced with respect to the heat dissipating body. However, in each of these disclosures, the portion of the heat pipe attached to the heat generating component does not pivot for permitting access to the heat generating component.

Most portable computers have a removable or hinged door adjacent to the memory modules for permitting user access to the memory modules through an opening in the enclosure. However, it is very difficult to get a good thermal conduction path from the memory area through the door due to the door being movable with respect to the memory modules. Through experimentation, it has been determined that the temperature of the enclosure of the notebook adjacent to the memory modules can reach temperatures as high as 57 deg. C. This temperature is unacceptable from an ergonomic standpoint as well as from a reliability standpoint.

Accordingly, there is a need for an apparatus for cooling a heat generating component in a computer that exhibits an exceptional cooling capacity and provides easy access to the heat generating component through a movable door without requiring removal of various components of the apparatus.

SUMMARY

One embodiment, accordingly, provides a cooling apparatus that includes a heat dissipating portion that is remotely located with respect to the heat generating component in a computer and a heat extraction portion that is movably connected between the heat generating component and the heat dissipating portion for permitting easy access to the heat generating component. To this end, a cooling apparatus includes an enclosure having a face with an opening formed therein. A heat extraction member is in the enclosure. A door is pivotally mounted on the enclosure adjacent to the opening for being moved between an open position and a closed position, and the heat extraction member pivots with the door. A heat dissipating body is mounted in the enclosure. A heat routing member is attached at a first end to the heat extraction member and at a second end to the heat dissipating body.

A principal advantage of this embodiment is that the removable heat generating component can be cooled using a heat routing member and a remotely located heat dissipating body while still permitting the heat generating component to be readily accessed through the opening in the enclosure.

BRIEF DESCRIPTION OF THE DRAWINGS FIGURES

DETAILED DESCRIPTION

Figure 1:
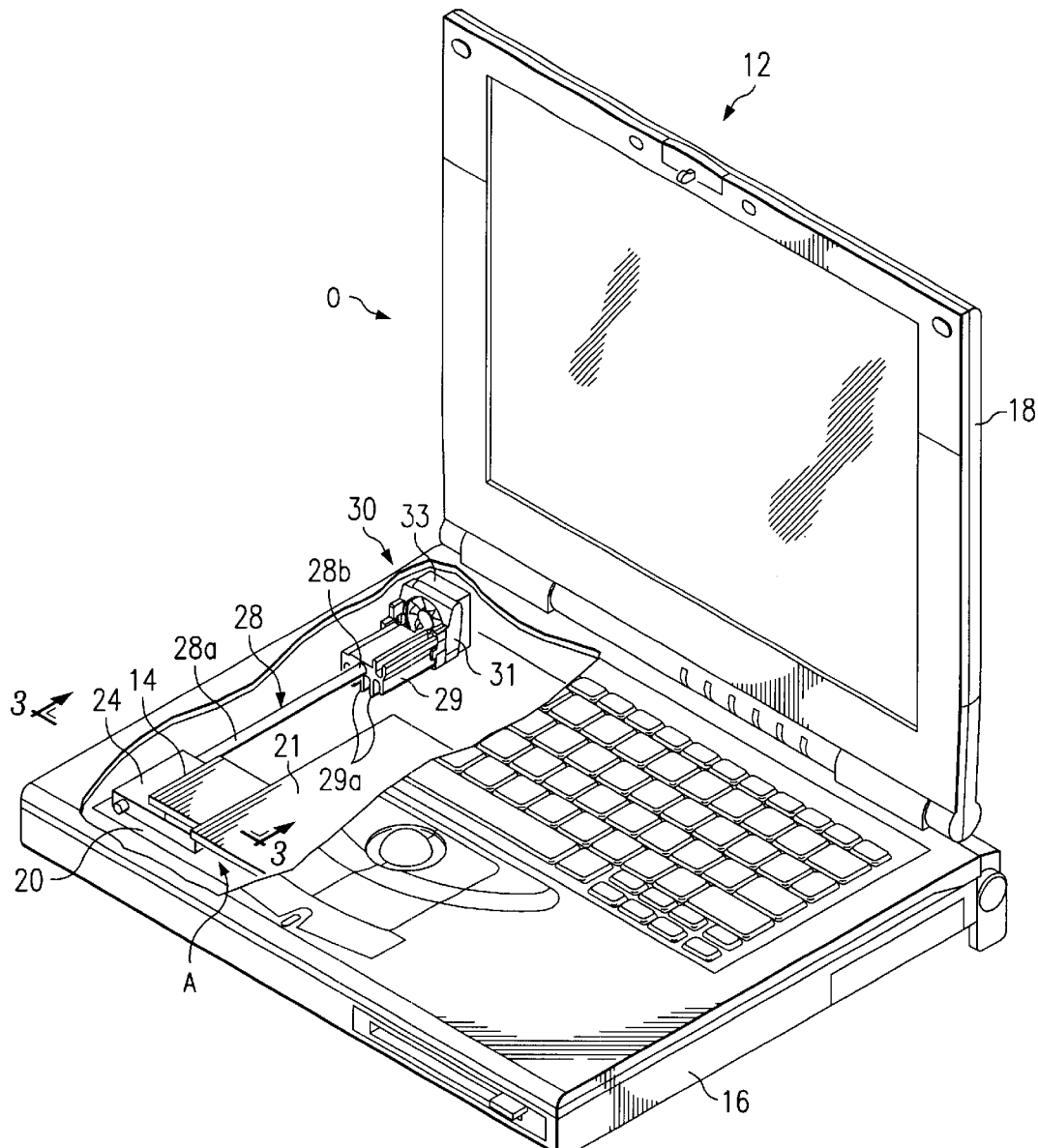
FIG. 1 is a fragmented perspective view illustrating an embodiment of a portable computer with an access door in a closed position.
Figure 2:
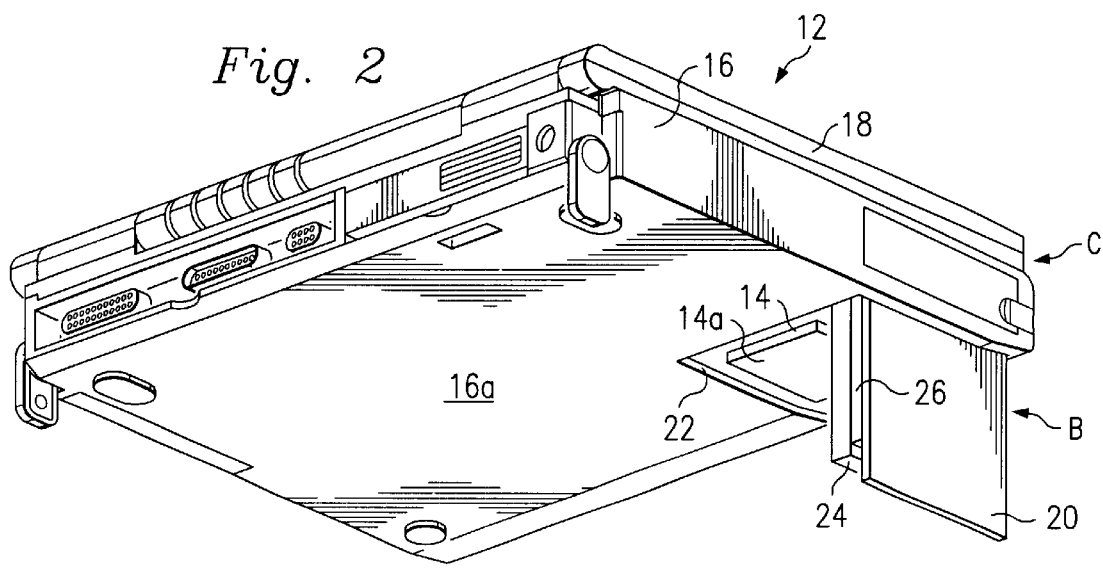
FIG. 2 is a perspective view illustrating an embodiment of the portable computer with the access door in the open position.

An embodiment of an electronic device 12, such as a portable computer, is illustrated in FIGS. 1 and 2. A heat generating component 14 is mounted in a base enclosure 16 of the electronic device 12. A top enclosure 18 of the electronic device 12 is movable between an open position O, FIG. 1, and a closed position C, FIG. 2, with respect to the base enclosure 16.

Still referring to FIGS. 1 and 2, the base enclosure 16 includes a door 20 that is pivotally mounted for being moved between a closed position A, FIG. 1, and an open position B, FIG. 2, with respect to the base enclosure 16. The heat generating component 14 is attached to a printed circuit substrate 21, FIG. 1 and is positioned adjacent to an opening 22, FIG. 2, in a bottom face 16a of the base enclosure 16. A heat extraction member 24, such as a thermal block, is attached to the door 20. A resilient member 26, such as a compliant polymeric pad, is disposed between the door 20 and the heat extraction member 24.

A heat routing member 28, FIG. 1, such as a heat pipe, is attached at a first end 28a to the heat extraction member 24 and at a second end 28b to a heat dissipating body 29, such as a heat sink. Heat is transferred from the heat generating device 14 through the heat routing member 28 to the heat dissipating body 29. A fan assembly 30 is mounted in the base enclosure 16 adjacent to the heat dissipating body 29 for directing a stream of air over the heat dissipating body 29 to enhance the dissipation of heat from the heat dissipating body 29. The fan assembly 30 includes a shroud 31 attached to the heat dissipating body 29 and an electrically powered fan 33 attached to the shroud 31. The heat dissipating body 29 includes a plurality of cooling fins 29a.

When the door 20 is in the closed position A, FIG. 1, the heat extraction member 24 is engaged against a surface 14a, FIG. 2, of the heat generating component 14. The resilient member 26 serves to reduce misalignment between the surface 14a of the heat generating component 14 and the corresponding surface of the heat extraction member 24 that engages the heat generating component 14. The resilient member 26 also acts to provide a relatively uniform contact pressure between the heat generating component 14 and the heat extraction member 24. By reducing misalignment and providing uniform contact pressure, thermal conductivity between the heat generating component 14 and the heat extraction member 24 is enhanced.

When the door 20 is in the open position B, FIG. 2, the door 20 and the heat extraction member 24 are positioned such that the interior contents of the electronic device 12 that are positioned adjacent to the opening 22, such as the heat generating component 14, are accessible through the opening 22. For example, in a portable computer, one or more memory modules are often removably attached to a motherboard for permitting the memory configuration to be modified (i.e., upgraded) subsequent to the computer being manufactured. To provide access, the memory module or modules are often positioned adjacent to a removable or hinged memory door that covers an access hole in the base portion of the computer.

Figure 3:
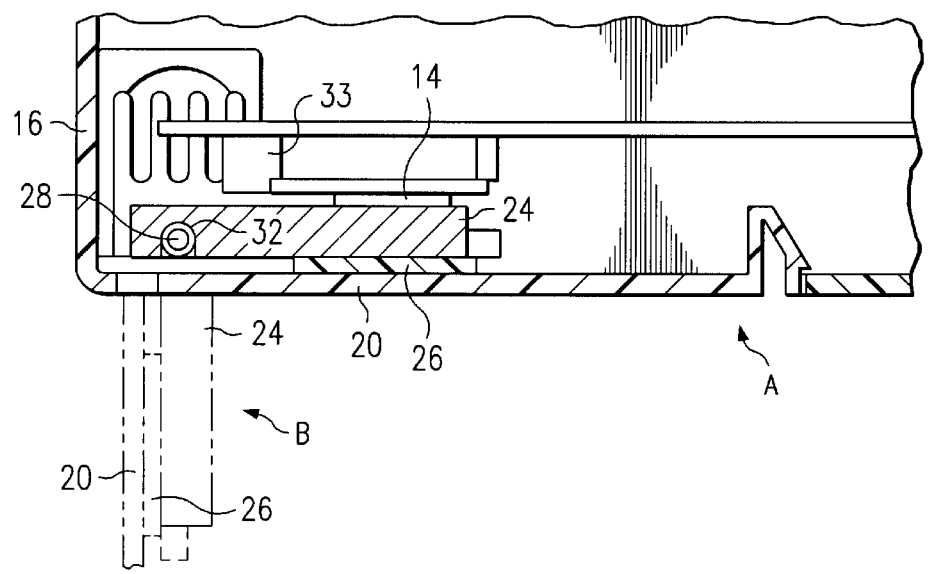
FIG. 3 is a cross sectional view taken along the line 3—3 in FIG. 1.

As illustrated in FIG. 3, a portion of the heat routing member 28 is mounted in a channel 32 in the heat extraction member 24. The channel 32 and the portion of the heat routing member 28 mounted in the channel 32 are generally straight. In this configuration, the door 20, the resilient member 26 and the heat extraction member 24 may pivot about a longitudinal axis of the portion of the heat routing member 28 that is mounted in the channel 32. With the door 20 moved from the closed position A to the open position B, the heat generating component 24 may be disconnected from a connector 33 and removed from the base enclosure 16 for servicing or upgrade.

Figure 4:
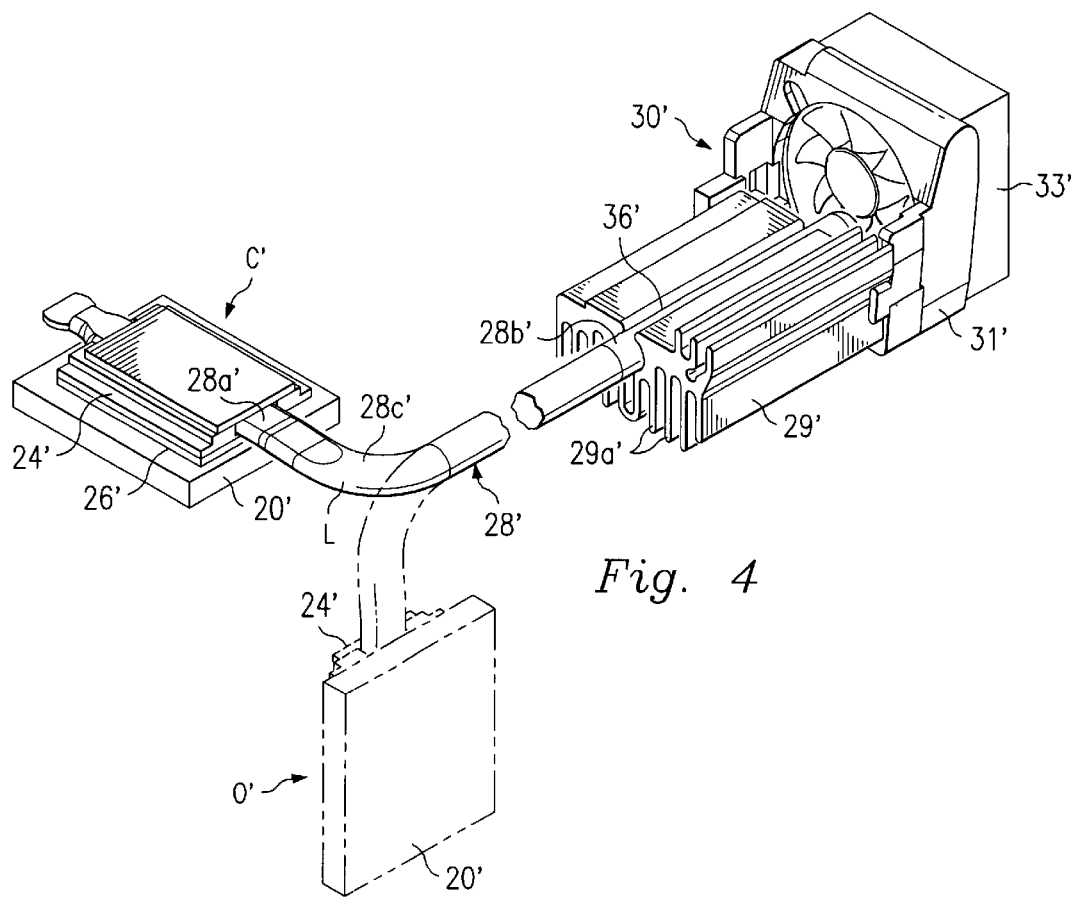
FIG. 4 is a perspective view illustrating an embodiment of a cooling apparatus.

Another embodiment of a cooling apparatus is illustrated in FIG. 4. The cooling apparatus includes a heat routing member 28' having a heat extraction member 24' attached adjacent to a first end 28a' of the heat routing member 24' and a heat dissipating body 29' attached adjacent to a second end 28b' of the heat routing member 24'. A resilient member 26' is attached to the heat extraction member 24' and a door 20' is attached to the resilient member 26'. A fan assembly 30' is attached to the heat dissipating body 29'. The fan assembly 30' includes a shroud 31' attached to the heat dissipating body 29' and an electrically powered fan 33' attached to the shroud 31'. The heat dissipating body 29' includes a plurality of cooling fins 29a'.

Heat pipes and heat dissipating panels are commercially available from a variety of sources such as Thermacore Incorporated, Lancaster, Pa. 17601, USA. Fans and heat sinks for fabricating forced convection heat exchangers are commercially available from sources such as Indek Corporation, 1239 Reamwood Ave, Sunnyvale, Calif. 94089, USA.

Still referring to FIG. 4, the second end 28b' of the heat routing member 28' is movably mounted, by a technique such as a press fit, in a generally straight channel 36' in the heat dissipating body 29'. The heat routing member 28' includes a bent portion 28c' between the first end 28a' and the second end 28b'. In this configuration, the heat extraction member 24', the resilient member 26' and the door 20' pivot about a longitudinal axis L of the channel 36' between a first position O' and a second position C'. With the cooling apparatus of FIG. 4 mounted in an electronic device, the heat extraction member 24' would be in contact with a heat generating component of the electronic device and the door would be in a closed position with respect to an opening of an enclosure of the electronic device when the heat extraction member is in the first position C'. Access to the heat generating component would be provided by moving the heat extraction member 24' to the second position O'.

Figure 5:
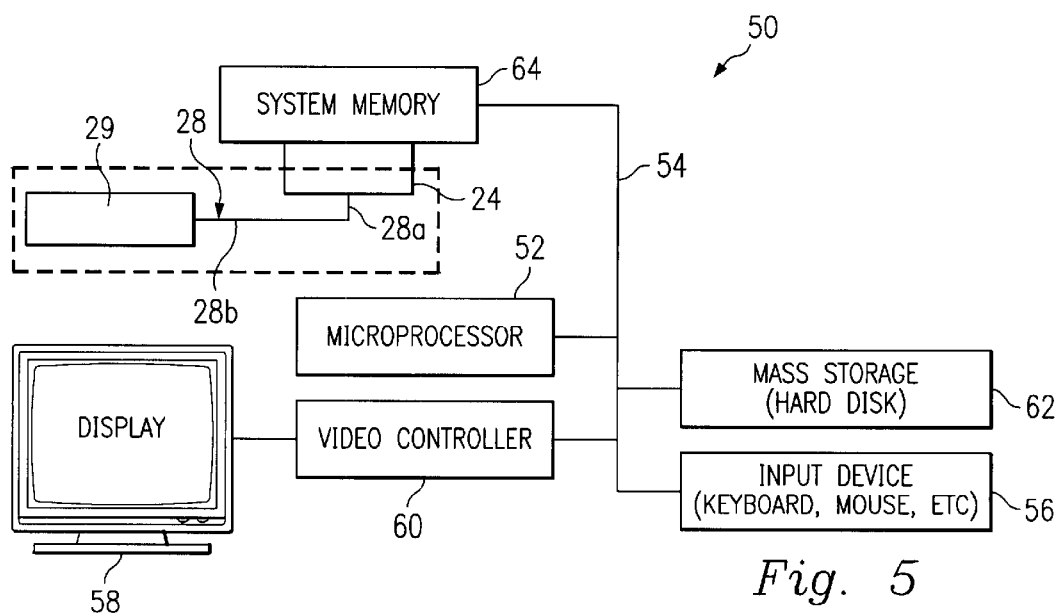
FIG. 5 is a block diagram illustrating an embodiment of a computer system.

An embodiment of a computer system 50 is illustrated in FIG. 5. The computer system 50 includes at least one microprocessor 52. The microprocessor 52 is connected to a signal bus 54. The signal bus 54 serves as a connection between the microprocessor 52 and other components of the computer system 50. One or more input devices 56 may be coupled to the microprocessor 52 to provide input to the microprocessor 52. Examples of input devices include keyboards, touchscreens, and pointing devices such as a mouse, a trackball and a trackpad. The computer system 50 may also include a display 58 which is typically coupled to the microprocessor 52 by a video controller 60. Programs and data are stored on a mass storage device 62 which is coupled to the microprocessor 52. Mass storage devices include components such as hard disks, optical disks, magneto-optical drives, floppy drives, and the like. A system memory 64 is coupled to the microprocessor 52 for providing the microprocessor 52 with fast storage to facilitate execution of computer programs by the microprocessor 52. It should be understood that other busses and intermediate circuits can be employed between the components described above and microprocessor 52 to facilitate interconnection between the components and the microprocessor 52.

Still referring to FIG. 5, the cooling apparatus discussed above in reference to FIG. 1 is thermally coupled to the system memory 64. The heat extraction member 24 is engaged against the system memory 64. The first end 28a of the heat routing member 28 is attached to the heat extraction member 24 and the second end 28b of the heat routing member 28 is attached to the heat dissipating body 29.

One embodiment provides a cooling apparatus including an enclosure having a face with an opening formed therein. A heat extraction member is in the enclosure. A door is pivotally mounted on the enclosure adjacent to the opening for being moved between an open position and a closed position. The heat extraction member pivots with the door. A heat dissipating body is mounted in the enclosure. A heat routing member is attached at a first end to the heat extraction member and at a second end to the heat dissipating body.

Another embodiment includes a computer system including an enclosure having a face with an opening formed therein. A heat extraction member is in the enclosure. A door is pivotally mounted on the enclosure adjacent to the opening for being moved between an open position and a closed position. The heat extraction member is mounted for pivoting with the door. A microprocessor is mounted in the enclosure and a memory device is coupled to the microprocessor to provide storage to facilitate execution of computer programs by the microprocessor. The memory device is mounted in the enclosure adjacent to the opening. The heat extraction member engages a surface of the memory device when the door is in the closed position. A mass storage device is coupled to the microprocessor and a display is coupled to the microprocessor by a video controller. A heat extraction member is attached to the door. A heat dissipating body is mounted in the enclosure. A heat routing member is attached at a first end to the heat extraction member and at a second end to the heat dissipating body.

A further embodiment provides a method of cooling components in a portable computer including an enclosure. An opening is formed in a face of an enclosure and a heat generating component is mounted in the enclosure adjacent to the opening. A door is pivotally mounted on the enclosure adjacent to the opening for being moved between an open position and a closed position with respect to the opening. A heat extraction member is mounted on the door. A heat dissipating body is mounted in the enclosure. A heat routing member is mounted in the enclosure by attaching a first end to the heat extraction member and a second end to the heat dissipating body. The heat extraction member is engaged with a surface of the heat generating component when the door is in the closed position.

As it can be seen, the embodiments presented herein provide several advantages. The removable heat generating component can be cooled using a heat dissipating body such as a heat sink while still permitting the heat generating component to be readily accessed through the opening in the enclosure. Removable heat generating components in a portable computer may be cooled using a cooling apparatus that provides exceptional heat dissipating characteristics. The ability to accurately align the heat extraction portion of the cooling apparatus against a surface of the removable heat generating component enhances heat transfer. The skin temperature of the enclosure adjacent to the removable is reduced significantly.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims are construed broadly and in a manner consistent with the scope of the embodiments disclosed herein.

What is claimed is:

1. An apparatus for cooling a heat generating component in a portable computer, comprising:
   an enclosure including a face having an opening formed therein;
   a heat generating member mounted in the enclosure adjacent the opening;
   a heat dissipating body mounted in the enclosure;
   a heat routing member having a first and a second end, the second end being rotatably attached to the heat dissipating body, the first end being substantially bent at an angle relative to the second end such that the first end extends adjacent the opening; and
   a heat extraction member and a door attached to the first end;
   whereby the heat routing member is rotatable to a first position in the enclosure wherein the heat extraction member is in contact with the heat generating member and the door is in the opening, and the heat routing member is rotatable to a second position out of the enclosure wherein the extraction member extends out of the enclosure and the door is simultaneously rotated out of the opening.

2. The apparatus of claim 1 wherein the heat routing member includes a heat pipe.

3. The apparatus of claim 1 further comprising a compliant pad attached between the door and the heat extraction member.

4. The apparatus of claim 3 wherein the compliant pad is made of a resilient material.

5. The apparatus of claim 1 wherein the heat dissipating body is a heat sink.

6. The apparatus of claim 5 further comprising a fan and a shroud mounted adjacent the heat sink.

7. The apparatus of claim 1 wherein the heat extraction member is a thermal block.

8. The apparatus of claim 1 further comprising a fan mounted in the enclosure adjacent to the heat dissipating body for directing a stream of air over the heat dissipating body.

9. A computer system, comprising:
   an enclosure including a face having an opening formed therein;
   a microprocessor mounted in the enclosure;
   a memory coupled to the microprocessor to provide storage to facilitate execution of computer programs by the microprocessor, the memory device mounted in the enclosure adjacent to the opening;
   a mass storage coupled to the microprocessor;
   a video controller coupled to the microprocessor;
   a heat dissipating body mounted in the enclosure;
   a heat routing member having a first end and a second end, the second end being rotatably attached to the heat dissipating body, the first end being substantially bent at an angle relative to the second end such that the first end extends adjacent the opening; and
   a heat extraction member and a door attached to the first end;
   whereby the heat routing member is rotatable to a first position in the enclosure wherein the heat extraction member is in contact with the memory and the door is in the opening, and the heat routing member is rotatable to a second position out of the enclosure wherein the heat extraction member extends out of the enclosure and the door is simultaneously rotated out of the opening.

10. The computer system of claim 1 wherein the heat routing member includes a heat pipe.

11. The computer system of claim 9 further comprising a compliant pad attached between the door and the heat extraction member.

12. The computer system of claim 11 wherein the compliant pad is made of a resilient material.

13. The computer system of claim 9 wherein the heat dissipating body is a heat sink.

14. The computer system of claim 13 further comprising a fan and a shroud mounted on the heat sink.

15. The computer system of claim 9 wherein the heat extraction member is a thermal block.

16. The computer system of claim 9 further comprising a fan mounted in the enclosure adjacent to the heat dissipating body for directing a stream of air over the heat dissipating body.

17. A method for cooling components in a portable computer, comprising:

forming an opening in a face of an enclosure;

mounting a heat generating member in the enclosure adjacent the opening;

mounting a heat dissipating body in the enclosure;

bending a first end of a heat routing member at an angle relative to a second end of the heat routing member such that the first end is adjacent the opening;

rotatably attaching the second end to the heat dissipating body;

attaching the heat extraction member and a door to the front end;

rotating the heat routing member to a first position wherein the heat extraction member is in contact with the heat generating member and the door is in the opening; and rotating the heat routing member to a second position wherein the heat extraction member extends out of the enclosure and the door is simultaneously rotated out of the opening.

* * * * *